United States Patent

[11] 3,593,763

| [72] | Inventor | Peter J. Neild<br>North Vancouver, British Columbia, Canada |
|------|----------|-------------|
| [21] | Appl. No. | 858,629 |
| [22] | Filed | Sept. 17, 1969 |
| [45] | Patented | July 20, 1971 |
| [73] | Assignee | MacMillan Bloedel Limited<br>Vancouver, British Columbia, Canada |

[54] SAW-STABILIZING PRESSURE GUIDE
11 Claims, 12 Drawing Figs.

[52] U.S. Cl. .................................................. 143/160, 83/201.15
[51] Int. Cl. .................................................. B23d 55/08
[50] Field of Search .......................................... 83/201.15; 143/160; 308/5, DIG. 1

[56] References Cited
UNITED STATES PATENTS

| 3,225,801 | 12/1965 | Dunn et al. ................... | 143/160 |
| 3,479,097 | 11/1969 | McLauchlan et al. ......... | 83/201.15 X |
| 3,452,734 | 7/1969 | Cleland et al. ................ | 83/201.15 X |
| 3,465,794 | 9/1969 | McLauchlan et al. ......... | 83/201.15 X |

*Primary Examiner*—James M. Meister
*Attorney*—Fetherstonhaugh & Co.

ABSTRACT: One or more pressure guides for maintaining the blade of a band saw in the cutting area thereof in a predetermined path of travel. Fluid is directed by each guide against opposite side edges only of the blade to create a fluid pressure against said side edges. Means can be provided at the guide for relieving fluid pressure against the saw blade centrally between the portions thereof near said side edges.

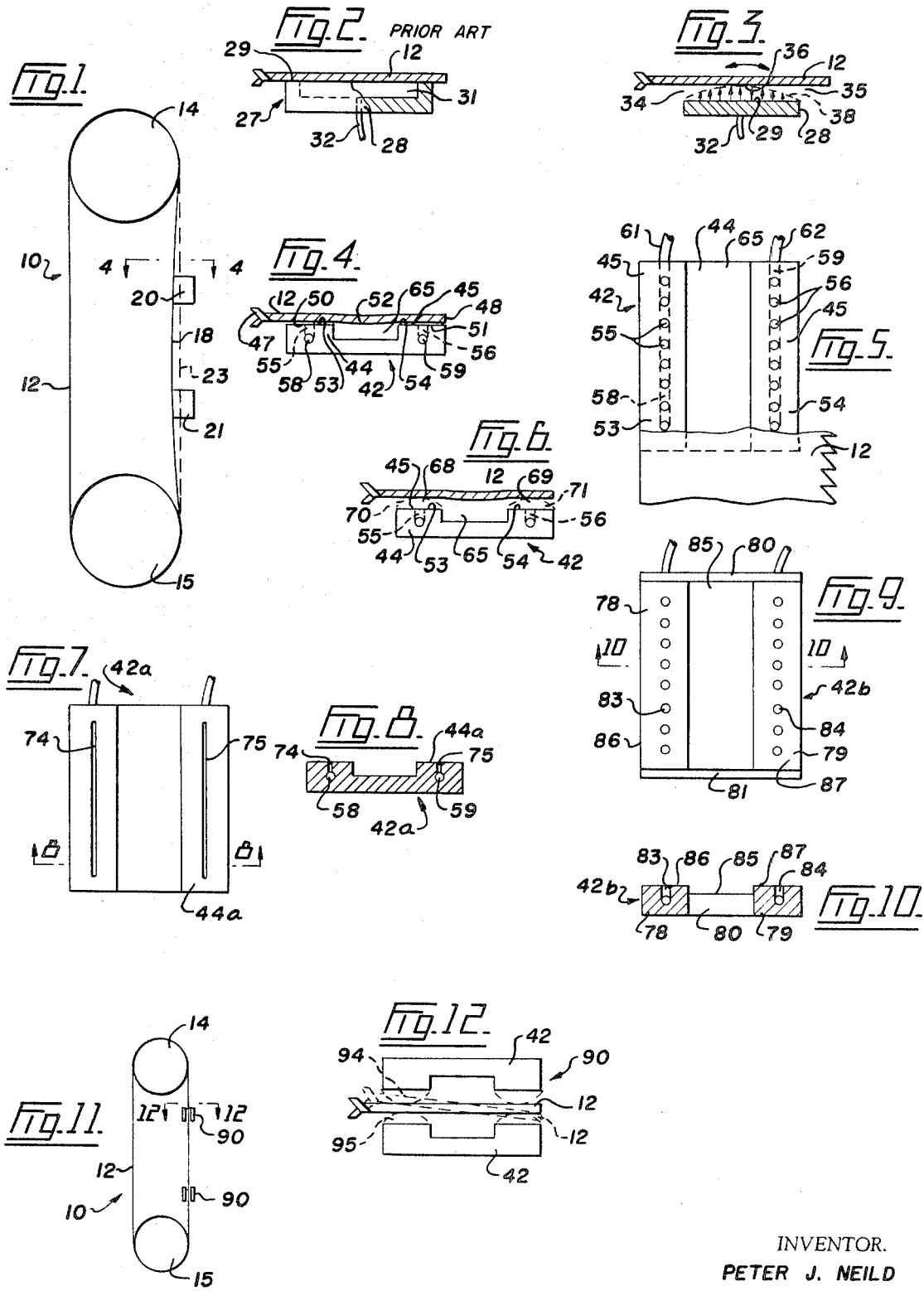
INVENTOR.
PETER J. NEILD 3,593,763

SAW-STABILIZING PRESSURE GUIDE

BACKGROUND OF THE INVENTION

This invention relates to pressure guides for stabilizing saw blades in the areas thereof which are subjected to edge pressure while the blades are cutting.

A band saw travels around spaced-apart wheels, and when an article, such as a piece of wood, is to be cut by the saw, the wood is moved against an edge of the blade between the wheels. In an effort to keep rigid the portion of the blade against which the wood is moved, the blade is kept under tension by forcing the wheels apart. It is common practice to form what is known as tire lines on the band saw blade along the edges thereof so as to make these edges the tightest areas of the blade. These tire lines are usually produced by stretching the center area of the blade between these lines. However, some band saw blades do not have tire lines thereon.

In spite of the previous efforts to improve band saw cutting, band saws cannot be used without special guides for accurate cutting. The blade tends to wander out of its normal plane, and this results in a wavy cut in the wood. In order to reduce this wandering action, guides have been used in an attempt to stabilize the portion of the blade that is doing the cutting. These guides usually are in the form of blocks made of lignae vitae or some other material with a low coefficient of friction, and these are forced against the blade to move it from its natural straight line path of travel between the band saw wheels. Each guide is fixed in this position and applies a force against the surface of the blade which stabilizes it so that greater cutting force is required to move the blade out of its new path. In order to prevent heating of the blade due to friction and also to reduce wear, water has been applied to the blade, but this causes problems in cold areas, and cannot be used when cutting dried stock.

As an alternative, means has been provided in prior guide blocks for directing air against the surface of the blade travelling over the block. This creates an air film on which the blade rides. This did not work satisfactorily, and considerable noise was created. When air was used in this manner, the blade tended to teeter on an air cushion across its normal cutting plane, causing considerable vibration and resulting in wavy cuts.

SUMMARY OF THE INVENTION

With the pressure guide of the present invention, the fluid used may be either liquid, usually water, or gas, usually air. If it is too cold to use water or if the wood being cut is dried stock, air is used. This pressure guide is such that the air does not cause any teetering or rocking of the blade so that no undue vibration is created and straight cuts are attained.

A stabilizing pressure guide according to the present invention includes block means having surface means over which the band saw blade travels as it is deflected by the block means out of its natural path of travel between the wheels of the band saw. Means is provided at the block means for directing fluid against the portion of the saw blade travelling over the surface means adjacent opposite side edges only of said blade to create a fluid film between the surface means and the blade side edge areas on which the blade rides. This means for directing fluid preferably is in the form of laterally spaced apertures in the surface means and over which side edge portions of the blade travel. It is preferable to provide means at the block means for relieving the fluid pressure against the saw blade centrally between the portions thereof near its side edges. The block means usually is a block having a surface over which the saw blade travels.

In an alternative form of the invention, a pair of spaced-apart blocks are provided having opposed faces between which the band saw blade travels. Means in each block directs fluid against the portions of the saw blade travelling past the surface thereof adjacent opposite side edges only of the blade. With this arrangement, when a side edge of the blade is moved by the cutting action out of the cutting plane of the blade towards one block, the pressure of the fluid between the block and said side edge tends to increase while the fluid pressure between this side edge and the other block tends to decrease so that said blade side edge is moved back to the original cutting plane. Thus, if the cutting force is sufficient to start moving the side edge of the blade out of the normal cutting plane of said blade, this is automatically opposed, and the tendency is to keep the blade in its proper cutting plane.

BRIEF DESCRIPTION OF THE DRAWINGS

FIG. 1 is a diagrammatic side elevation of a band saw with pressure guides deflecting a portion of the blade out of its natural plane between the wheels, FIG. 2 is a diagram of a pressure guide of the prior art, FIG. 3 diagrammatically illustrates a problem inherent in this prior art guide, FIG. 4 is a section taken on the line 4—4 of FIG. 1, illustrating one form of the invention, FIG. 5 is a front elevation of the guide of FIG. 4 with part of the saw blade broken away, FIG. 6 diagrammatically illustrates the effect of a guide in accordance with this invention on the saw blade, FIG. 7 is a view similar to FIG. 5 showing an alternative form of pressure guide in accordance with this invention, FIG. 8 is a cross section taken on the line 8—8 of FIG. 7, FIG. 9 is a view similar to FIG. 5 of another alternative form of the invention, FIG. 10 is a cross section taken on the line 10—10 of FIG. 9, FIG. 11 is a side elevation of a band saw, illustrating still another alternative form of the invention, and FIG. 12 is a diagrammatic cross section taken on the line 12—12 of FIG. 11, illustrating the effect of this alternative guide on the saw blade.

DESCRIPTION OF THE PREFERRED EMBODIMENT

Referring to FIG. 1, 10 is a standard band saw arrangement which includes an endless band saw 12 travelling around spaced apart upper and lower wheels 14 and 15. This band saw may have cutting teeth along one edge only thereof, or along both of its edges. There are some band saws with teeth along only one edge so that the wood being cut has to be moved always in the same direction. On the other hand, there are blades with teeth along both edges so that the wood can be moved horizontally in either direction for the cutting operation. The portion of blade 12 where the cutting takes place is indicated at 18.

Band saw arrangement 10 includes upper and lower pressure guides 20 and 21 which are positioned so as to deflect the cutting portion 18 of the saw blade inwardly out of its natural path of travel between the upper and lower wheels, said natural path being indicated by broken line 23. In actual practice, guides 20 and 21 can, if desired, be located on the opposite face of the blade so as to deflect it outwardly. In addition, only one guide may be used, usually the upper one, if the cutting force to which the blade is subjected is not too great. In this case, lower wheel 15 usually is so located that the cutting portion 18 of the blade is in a vertical plane.

FIG. 2 illustrates a pressure guide 27 of the prior art in the form of a block 28 having a surface 29 over which band saw blade 12 travels. Block 28 is formed with a cavity or pocket 31 in surface 29 thereof which is connected to a source of pressure air, not shown, by a pipe 32 which opens into said cavity or pocket.

Air is directed into pocket 31 so as to maintain the pressure therein higher than atmospheric pressure. As a result, the saw blade rides on this higher pressure air. However, it has been found that there is a great deal of vibration in the cutting blade when guide 27 is used. In addition, the blade tends to wander out of its deflected plane.

As an alternative in the prior art, instead of a large pocket 31, block 28 may have a vertical row of holes centrally thereof through which air is blown to maintain a central air cushion over which the saw blade rides. This also results in blade vibration and wandering.

The reason for this vibration and wandering has been discovered, and is eliminated by the present invention. FIG. 3 diagrammatically illustrates the problem involved. The air from pocket 31 is directed against the adjacent surface of blade 12 as the latter moves over the guide block. As some of this air escapes in the areas adjacent the side edges 34 and 35 of the saw blade, the pressure near these side edges is reduced, whereas the pressure against the central portion 36 of the blade is not so reduced since the air cannot escape laterally as easily. As a result, the air pressure distribution resembles something like a transversely curved surface 38 formed between the blade and block surface 29 on which the blade can rock laterally. This causes the blade to make a wavy cut, and the rocking action causes excessive vibration in the blade.

FIGS. 4 and 5 illustrate one form of pressure guide 42 made in accordance with the present invention. This guide 42 includes a block 44 having a surface 45 past which saw blade 12 travels. By referring to FIG. 4, it will be seen that blade 12 has cutting teeth 47 along one edge thereof, while its opposite edge 48 is plain. However, if desired, there could be cutting teeth along this edge 48. Blade 12 has tire lines 50 and 51 adjacent its opposite side edges, and these are formed by stretching the center portion of the blade between these tire lines, this central stretched portion being exaggerated at 52 in FIG. 4.

Aperture means is provided in side portions 53 and 54 of surface 45 of the guide block over which tire lines 50 and 51 travel. In this example, the aperture means comprises a plurality of apertures 55 in surface 53 and a plurality of apertures 56 in surface 54. Apertures 55 are joined by a passage 58 in the block, while apertures 56 are joined by a passage 59, said passages 58 and 59 being connected to a suitable source of fluid pressure, not shown, by pipes 61 and 62.

Fluid, such as water or air, is directed through apertures 55 and 56 only against the portions of the blade adjacent the side edges thereof, this being along tire lines 50 and 51 in this example. It is preferred, although not absolutely necessary, to provide means in surface 45 of block 44 to relieve fluid pressure against blade 12 centrally between the tire lines thereof. In this example, a channel 65 is formed in surface 45 between the rows of apertures 55 and 56, said channel extending the length of the block so that it communicates with the atmosphere outside the block.

During operation of the band saw arrangement, fluid is directed by apertures 55 and 56 against the side portions only of blade 12 to lift said side portions off surfaces 53 and 54 of the pressure block. The central portion of the blade rides over channel 45 which is in communication with the atmosphere so that said center portion is not subjected to fluid pressure. The operation is the same even if blade 12 is not formed with tire lines 50 and 51 and central stretched area 52. Furthermore, even if channel 65 is not provided in the block, the pressure against the blade along the side edges thereof would be greater than it would be against the central area of the blade.

FIG. 6 illustrates the effect of this pressure block 42 on the saw blade. The pressure of the fluid from apertures 55 and 56 is against the side edge portions only of the blade, and the air pressure distribution at these side portions resembles something like curved surfaces 70 and 71 between these side portions and block surfaces 53 and 54 so that the blade cannot rock in the manner illustrated in FIG. 3. Air escapes outwardly in a lateral direction at the side edges of the blade, but it also escapes laterally inwardly into channel 65 so that there is no central bearing point on which the blade can rock.

FIGS. 7 and 8 illustrate an alternative form of guide 42a. This guide has a block 44a similar to block 44, the only difference being that instead of apertures 55 and 56, block 44a is formed with slots 74 and 75 which are in communication with passages 58 and 59 of the block. Slots 74 and 75 function in the same manner as apertures 55 and 56.

FIGS. 9 and 10 illustrate a guide 42b which is made up, instead of a single block, of two spaced-apart blocks 78 and 79 which are held together in any suitable manner, such as by bars 80 and 81 secured to opposite ends thereof. Blocks 78 and 79 have apertures 83 and 84 in surfaces 86 and 87 thereof over which side portions of band saw 12 travel, said apertures being connected to a suitable source of pressure fluid, not shown. The space between blocks 78 and 79 forms a channel 85 over which the central portion of the blade travels, said channel being in communication with the atmosphere, as shown in FIG. 10. If desired, blocks 78 and 79 may have slots in surfaces 86 and 87 thereof in place of the apertures 83 and 84.

Guide 42b functions in the same manner as the previously described guides.

FIG. 11 illustrates band saw arrangement 10 with upper and lower identical pressure guides 90, these guides are used when it is not necessary to deflect blade 12 outwardly from its natural path of travel between wheels 14 and 15. These guides maintain the cutting portion of the saw blade in a predetermined path of travel.

Each pressure guide 90 is made up of a pair of spaced-apart and opposed blocks, and each of these may be any one of the pressure blocks described above. For the purpose of illustration, two blocks 42 are shown in FIG. 12. During operation, the pressure of the air directed out of the apertures of these blocks against the side edge portions of the saw blades is adjusted so that the blade is normally substantially equally spaced from both blocks as shown in FIG. 12. If the cutting force tends to swing the side edge of the blade out of the predetermined path of the blade, said edge is moved towards one of the blocks, and in FIG. 12, the blade is shown in dotted lines with its cutting edge moved towards the upper block 42. This results in the air pressure at 94 increasing since it cannot readily escape past the adjacent saw edge, while the pressure at 95 decreases as the escape area for the fluid has increased on this side of the blade. This results in the twisting movement of the blade being resisted, and the air pressure returns the blade to its predetermined plane so that the fluid pressure on opposite sides of the blade is balanced. When one of the edges of the blade is moved towards one of the blocks, the opposite edge of the blade moves towards the other block so that the same balancing action takes place at said other edge to help stabilize the blade.

If desired, only one pressure guide 90 can be used, and this is usually the upper one. In the latter case, lower wheel 15 is located so that the cutting portion of the blade is in a vertical plane.

What I claim is:

1. A stabilizing pressure guide for maintaining the blade of a band saw in a predetermined path of travel between wheels around which the band saw travels during operation thereof, comprising block means having surface means over which said band saw blade travels, and means at the block means for directing fluid against the portions of the saw blade travelling over the surface means adjacent only opposite side edges of said blade to create a fluid pressure against said side edge portions to keep said portions off said surface means.

2. A pressure guide as claimed in claim 1 in which said means for directing fluid comprises spaced-apart aperture means in said surface means and over which side edge portions of the blade travel.

3. A pressure guide as claimed in claim 1 including means in the block means for relieving fluid pressure against said saw blade centrally between said side edge portions thereof.

4. A pressure guide as claimed in claim 3 in which said relieving means comprises channel means in the block means over which the central portion of the blade between its side edge portions travels, said channel means being in communication with the atmosphere outside the block means.

5. A pressure guide as claimed in claim 4 in which said channel means comprises a groove in said surface means of the block means and opening out to atmosphere.

6. A stabilizing pressure guide for maintaining the blade of a band saw in a predetermined path of travel between wheels around which the band saw travels during operation thereof, comprising a pair of spaced-apart first and second blocks having opposed faces between which said band saw blade travels, and means in each block for directing fluid against the portions of the saw blade travelling past the surface of said each block adjacent only opposite side edges of said blade, whereby when a side edge of the blade is moved out of the predetermined path of the blade towards the first block, the pressure of the fluid between the first block and said side edge tends to increase while the fluid pressure between said side edge and the second block tends to decrease so that said side edge is moved back to the predetermined plane.

7. A pressure guide as claimed in claim 6 in which said means for directing fluid in each block comprises spaced-apart aperture means in said each block face and over which side edge portions of the blade travel.

8. A pressure guide as claimed in claim 6 in which said means for directing fluid in each block comprises aperture means in said each block face and over which side edge portions of the blade travel.

9. A pressure guide as claimed in claim 6 including means in each block for relieving fluid pressure against said saw blade centrally between said side edge portions thereof.

10. A pressure guide as claimed in claim 9 in which said relieving means comprises channel means in each block over which the central portion of the blade between its side edge portions travels, said channel means being in communication with the atmosphere outside the block means.

11. A pressure guide as claimed in claim 10 in which said channel means in each block comprises a groove in said surface of said each block and opening out to atmosphere.